US009344268B1

(12) United States Patent
Nazemi et al.

(10) Patent No.: US 9,344,268 B1
(45) Date of Patent: May 17, 2016

(54) PHASE ALIGNMENT ARCHITECTURE FOR ULTRA HIGH-SPEED DATA PATH

(71) Applicant: Broadcom Corporation, Irvine, CA (US)

(72) Inventors: Ali Nazemi, Aliso Viejo, CA (US); Burak Catli, Costa Mesa, CA (US); Wayne Wah-Yuen Wong, San Jose, CA (US); Kangmin Hu, Irvine, CA (US); Hyo Gyuem Rhew, Irvine, CA (US); Delong Cui, Tustin, CA (US); Jun Cao, Irvine, CA (US); Bo Zhang, Irvine, CA (US); Afshin Doctor Momtaz, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/668,165

(22) Filed: Mar. 25, 2015

Related U.S. Application Data

(60) Provisional application No. 62/096,006, filed on Dec. 23, 2014.

(51) Int. Cl.
*H04L 7/00* (2006.01)
*H04L 7/033* (2006.01)

(52) U.S. Cl.
CPC ............ *H04L 7/0091* (2013.01); *H04L 7/0025* (2013.01); *H04L 7/0331* (2013.01)

(58) Field of Classification Search
CPC ... H04L 7/0091; H04L 7/0025; H04L 7/0331; H04L 7/0337; H04L 7/033; H04L 25/03885; H04L 7/0037; H04L 7/00; H04L 7/0008; H04L 2027/0055; H04L 2027/0067; H04L 2027/0097; H04L 25/03019; H03L 7/00; G06F 1/10; G06F 1/06

See application file for complete search history.

(56) References Cited

U.S. PATENT DOCUMENTS

| 8,116,418 | B2 * | 2/2012 | Chien | H03L 7/0814 327/107 |
| 8,344,772 | B2 * | 1/2013 | Lee | H03L 7/085 327/150 |
| 2007/0047683 | A1 * | 3/2007 | Okamura | H03L 7/0814 375/355 |
| 2013/0294490 | A1 * | 11/2013 | Chandrasekaran | H04L 7/0079 375/226 |
| 2014/0139266 | A1 * | 5/2014 | Kenney | G01R 25/005 327/9 |

OTHER PUBLICATIONS

Chiang, Ping-Chuan, et al., Section 2.3 60Gb/s NRZ and PAM4 Transmitters for 400GbE in 65nm CMOS. Feb. 10, 2014, 2014 IEEE International Solid-State Circuits Conference, pp. 42-44, Taipei, Taiwan.

* cited by examiner

*Primary Examiner* — Vineeta Panwalkar
(74) *Attorney, Agent, or Firm* — Brinks Gilson & Lione (57) ABSTRACT

A phase alignment architecture enhances the performance of communication systems. The architecture aligns a divided clock (e.g., in differential Inphase (I) and Quadrature (Q)) to a main clock, even at extremely high speeds, where skew variations of the divided clock are comparable to the main clock period. The improvement in phase alignment facilitates ultra high-speed communications.

20 Claims, 7 Drawing Sheets

PHASE ALIGNMENT ARCHITECTURE FOR ULTRA HIGH-SPEED DATA PATH

PRIORITY CLAIM

This application claims priority to provisional application Ser. No. 62/096,006, filed Dec. 23, 2014, which is entirely incorporated by reference.

TECHNICAL FIELD

This disclosure relates to data communications. This disclosure also relates to phase alignment of signals for high-speed data paths.

BACKGROUND

High-speed data paths are a crucial part of what is now indispensable worldwide data connectivity. The data paths are driven by many different types of communication devices, such as switches and routers that direct data packets from source ports to destination ports, helping to eventually guide the data packets from a source to a destination. Some devices achieve target data rates using very high-speed optical and Serializer/Deserializer (SerDes) circuitry. There are substantial challenges, however, involved in further increasing data rates. Improvements in phase alignment for high-speed data paths will help enhance the communication capabilities of high-speed communication devices.

DETAILED DESCRIPTION

Figure 1:
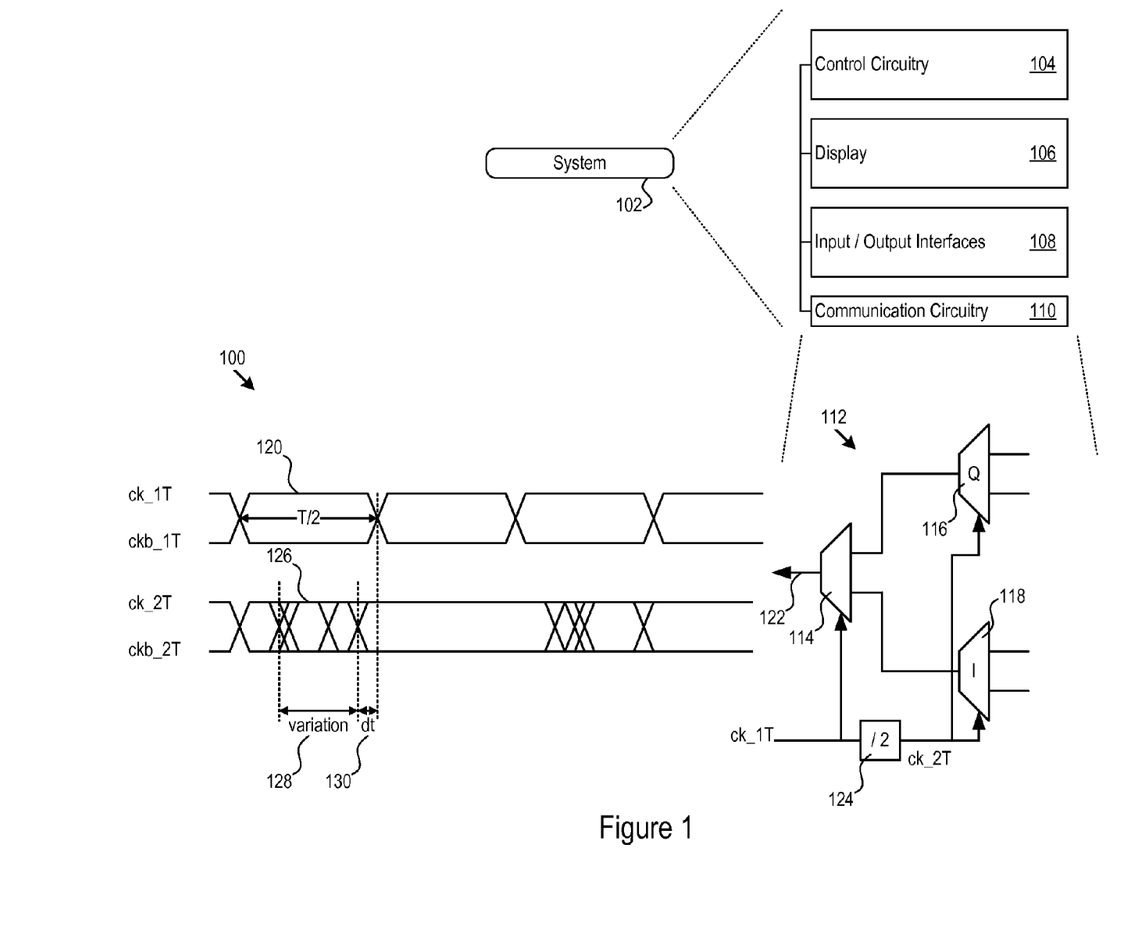
FIG. 1 shows an example of clock timing in a communications system.

FIG. 1 shows an example of clock timing 100 in a system 102. The system 102 may be virtually any system that receives, transmits, or processes signals. The system 102, as just one example, may include control circuitry 104, a display 106, input/output interfaces 108, and communication circuitry 110.

In the example shown in FIG. 1, the communication circuitry 110 includes transmit stream circuitry 112. In this example, the transmit stream circuitry 112 multiplexes two data streams into a transmit stream, e.g., with the transmit multiplexer 114. The transmit multiplexer 114 receives data inputs from the first data stream multiplexer 118 (e.g., an Inphase multiplexer), and the second data stream multiplexer 116 (e.g., a Quadrature multiplexer).

FIG. 1 shows a baseline transmit clock 120, ck_1T, having a period T, and which is in this example a differential clock. The baseline transmit clock drives the transmit multiplexer 114 to produce the transmit stream output 122. In this example, the transmit clock 120 runs twice as fast as the data stream multiplexers 116 and 118. A clock divider 124 divides the transmit clock 120 to create the data stream clock 126, ck_2T, which is also shown as a differential clock.

The clock divider 124, as would any other mechanism for generating a clock from the baseline transmit clock 120, introduces variable delay in the data stream clock 126, as shown by the phase variation 128. That is, the transitions in the data stream clock 126 do not always occur at the same delay with respect to transitions in the baseline transmit clock 120. As T decreases, the phase variation 128 may approach, and the remaining margin 130, 'dt' in FIG. 1, may be insufficient to prevent timing errors leading to increased bit error rate or decrease in signal to noise ratio. The phase alignment techniques described below help align the phases of the clocks derived from the baseline transmit clock 120, and thereby facilitate reliable operation at even ultra-high clock speeds, e.g., 32-96 Gbps, where clock periods may be as small as 10-16 picoseconds.

Figure 2:
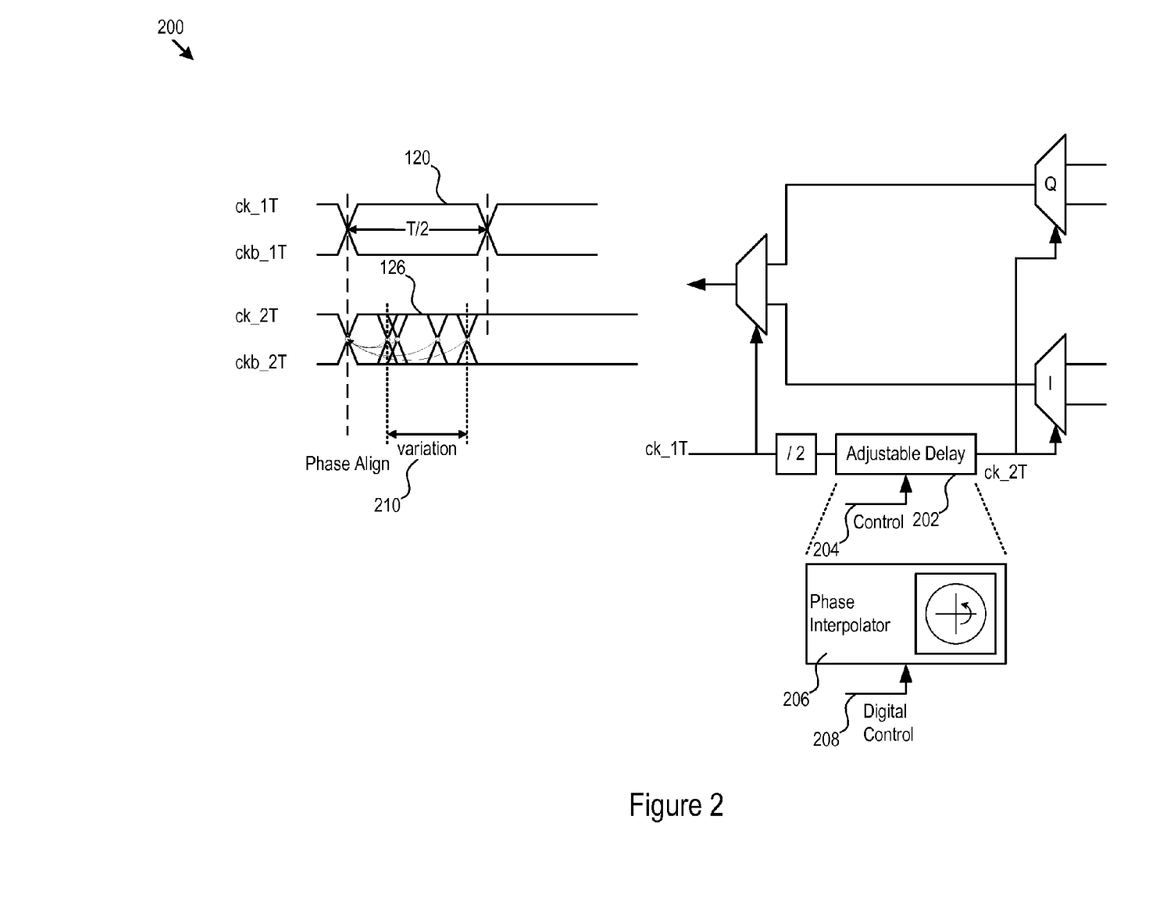
FIG. 2 is an example of phase control over clock timing in a communications system.

FIG. 2 is an example of phase control 200 over clock timing in a communications system. In FIG. 2, an adjustable delay circuit 202 advances or delays the phase of the data stream clock 126 responsive to a control input 204. In one implementation the adjustable delay circuit is a phase interpolator 206. The phase interpolator includes a digital control input 208. The digital control input 208 may be a multiple bit control word (e.g., a 66 bit control word) that adjusts (e.g., activates or deactivates) circuitry (e.g., current sources) in the phase interpolator 206 to cause a relative advance or delay in the phase of the signal passing through the phase interpolator 206. The timing resolution of the phase interpolators may be, for instance, approximately 240 femtoseconds, adjustable in discrete digital steps responsive to the control word on the digital control input.

As will be described in more detail below, processing circuitry may determine the digital control word to apply to the digital control input 208. The processing circuitry attempts to align the phase of the data stream clock 126 with the phase in the baseline transmit clock 120. For instance, as shown in FIG. 2, the phase interpolator 206 may adjust delays to reduce the phase variation 210, so that the phase of the data stream clock 126 aligns as closely as possible to the phase of the baseline transmit clock 120.

Figure 3:
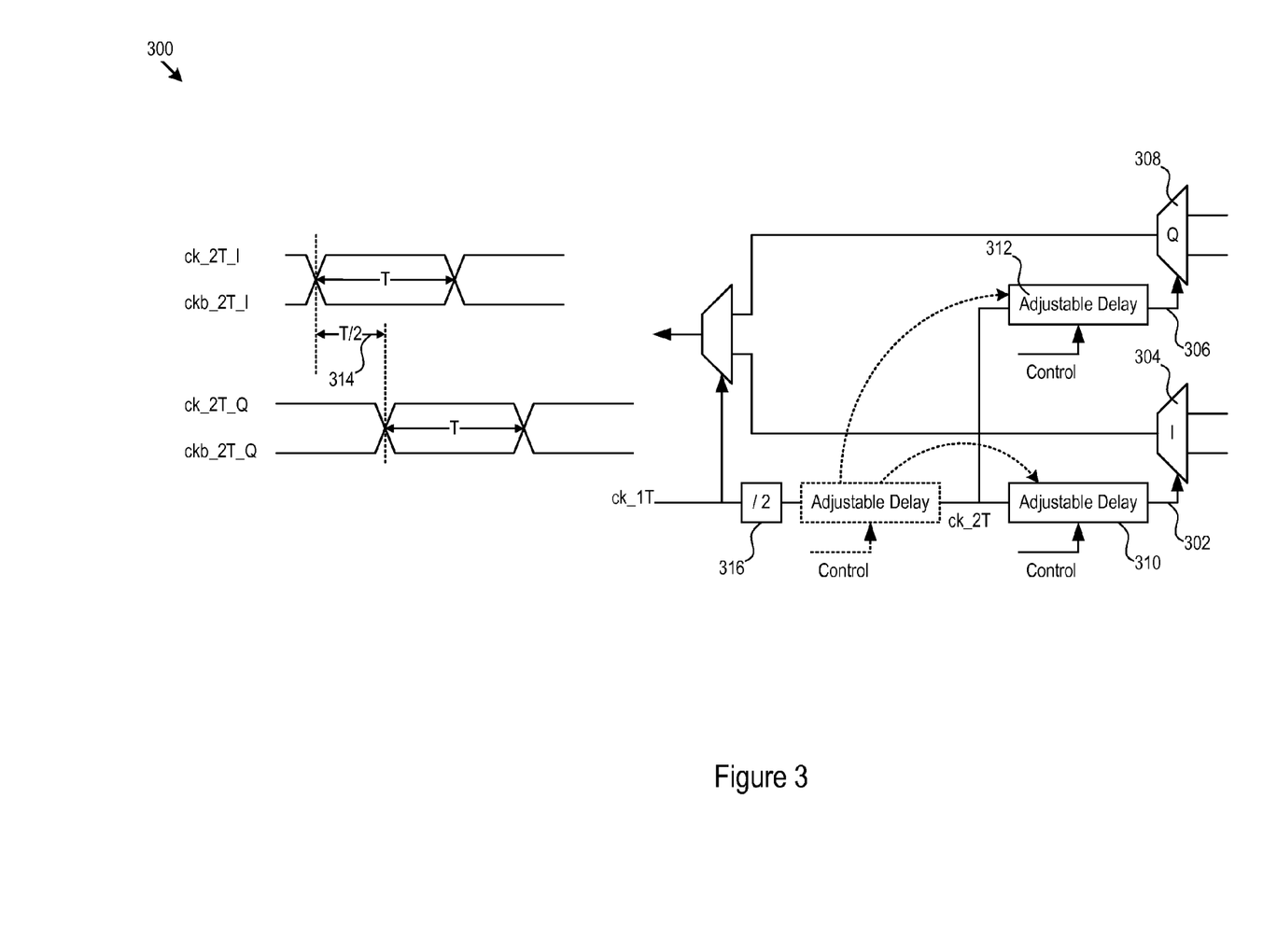
FIG. 3 is an example of phase control over clock timing in a communications system.

FIG. 3 shows another example 300 of phase control over clock timing in a communications system. FIG. 3 extends the example of FIG. 2 by showing that the data stream multiplexers 116 and 118 may be individually clocked. In the specific example of FIG. 3, an inphase clock output 302 drives the inphase data stream multiplexer 304, while the quadrature clock output 306 drives the quadrature data stream multiplexer 308.

An inphase adjustable delay circuit 310 provides phase adjustment for the inphase clock output 302. A quadrature adjustable delay circuit 312 provides phase adjustment for the quadrature clock output 306. Phase interpolators with digital control inputs may implement the adjustable delay circuits 310 and 312.

The inphase clock output 302 has a phase offset relative to that of the quadrature clock output 306. For instance, FIG. 3 shows a phase offset 314 of T/2. In other words, the phase offset 314 may nominally be ninety degrees. The clock divider 316 produces both the inphase clock output 302 and the quadrature clock output 306, e.g., each as differential clocks. The clock divider 316 produces the phase offset 314, and the adjustable delay circuits 312 and 310 provide independent and fine grain control over the phase offset 314.

Figure 4:
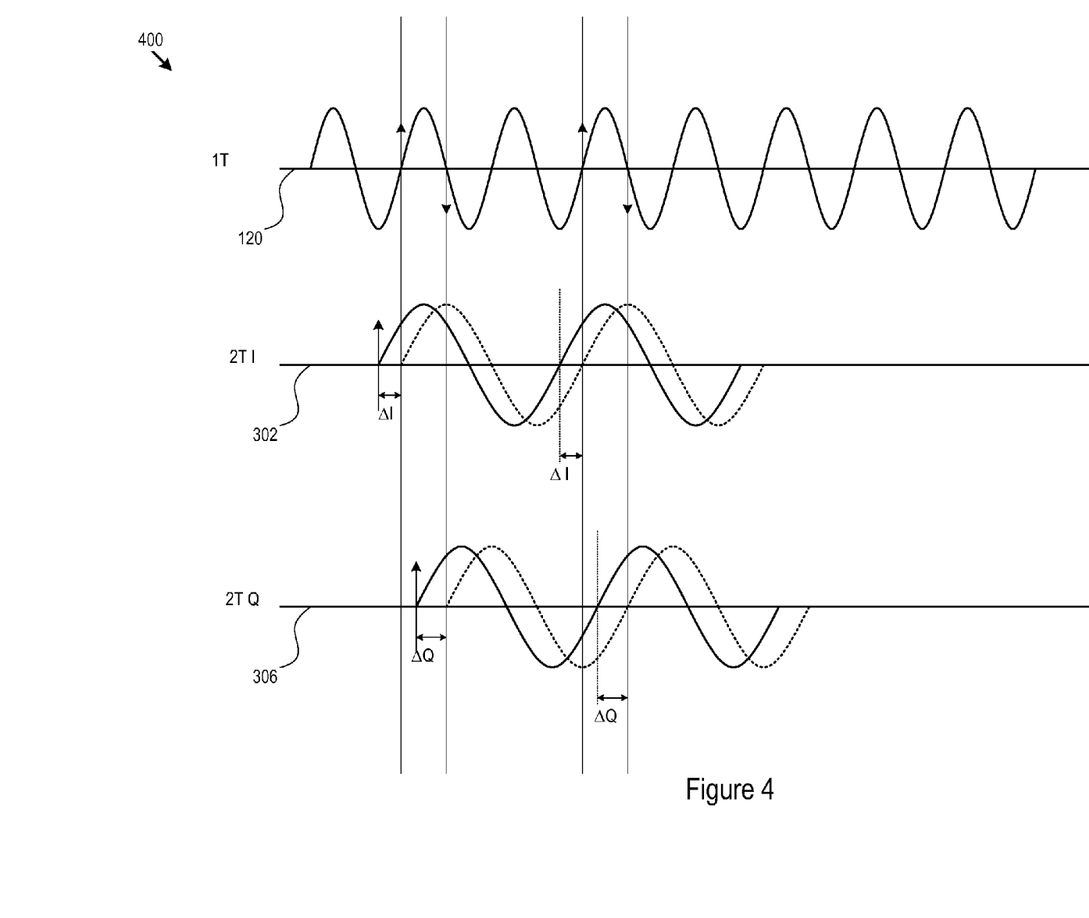
FIG. 4 is an example of Inphase (I) and Quadrature (Q) clock alignment to a baseline clock.

FIG. 4 is an example of inphase and quadrature clock alignment 400 to the baseline transmit clock 120. FIG. 4 shows the baseline transmit clock 120, the inphase clock output 302, and the quadrature clock output 306. The dashed clock signals show the corrected clock signals, while the solid lines show the uncorrected clock signals. For the inphase clock output 302, the adjustable delay circuitry 310 adjusts the clock phase by '$\Delta I$'. The result is shown as the dashed line clock signal, which, after phase adjustment, aligns its rising edge with the rising edge of the baseline transmit clock 120. For the quadrature clock output 306, the adjustable delay circuitry 312 adjusts the clock phase by '$\Delta Q$'. The result is shown as the dashed line clock signal, which, after phase adjustment, has its rising edge aligned with the falling edge of the baseline transmit clock 120, so that a 90 degree phase offset is maintained with respect to the inphase clock output 302.

Figure 5:
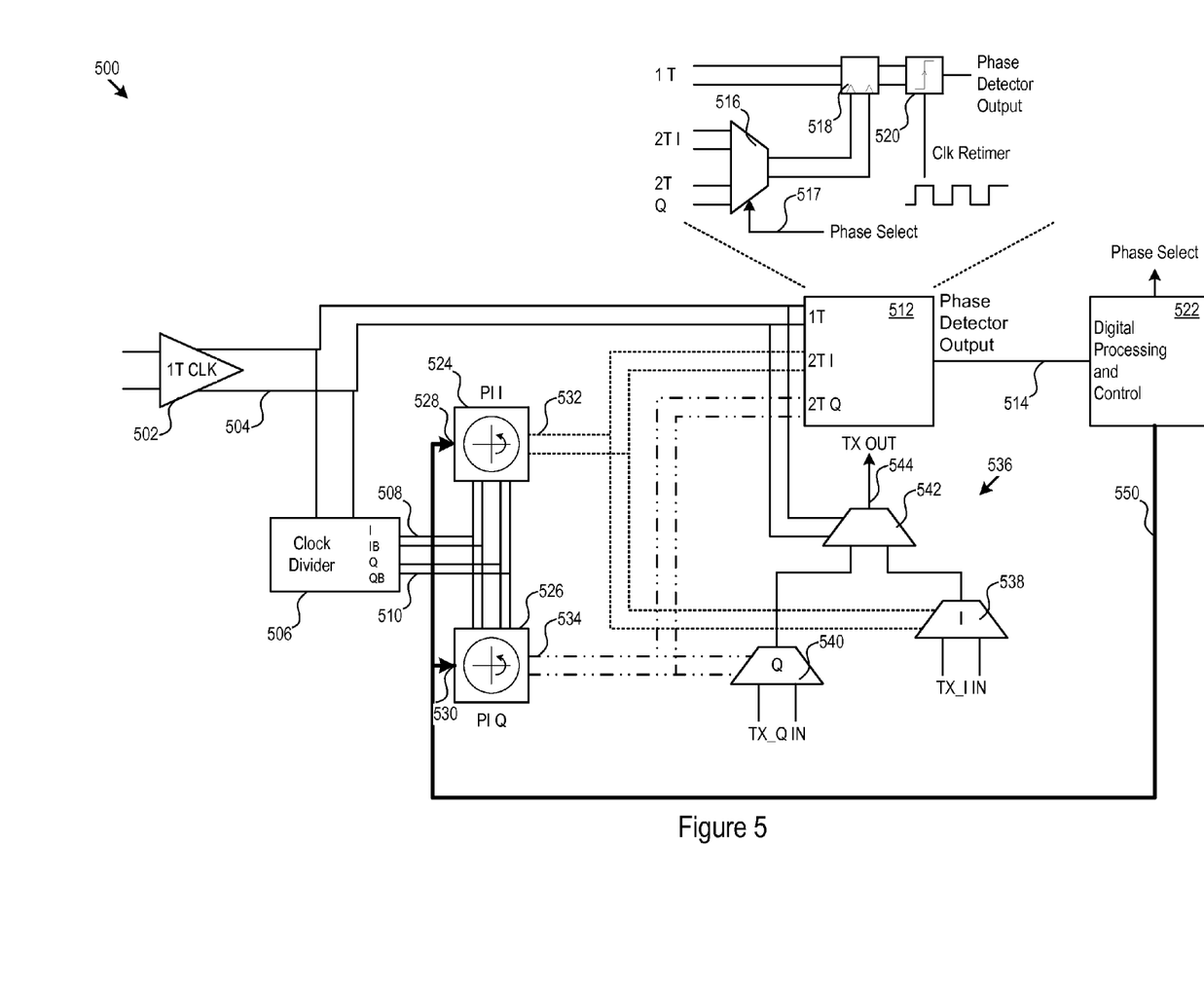
FIG. 5 shows an example of a system for adjusting clock phase.

FIG. 5 shows an example of a system 500 for sampling and adjusting clock phase. The system 500 includes a clock driver 502 with a (differential) transmit clock output 504. A clock divider 506 accepts the transmit clock output 504 and divides it down. In this case, the clock divider 506 divides the transmit clock down in frequency by two and accordingly drives a (differential) inphase clock output 508 and a (differential) quadrature clock output 510.

A phase detector 512 is also present. The phase detector 512 includes a phase detector output 514 and a phase selection circuit 516. The phase selection circuit 516 is configured to determine a selected phase chosen from between the inphase clock output and the quadrature clock output after phase control by the phase interpolators described below. A sampling circuit 518 is configured to obtain a clock sample from the transmit clock output 504 responsive to the selected phase. Further, a comparator 520 is configured to output a digital representation of the clock sample on the phase detector output 514. The phase detector is described below in more detail in FIG. 6.

Note that in FIG. 5, processing circuitry 522 is configured to accept the phase detector output 514, and controls a phase selection input 517 that determines whether the inphase clock output or the quadrature clock output samples the phase detector output 514 which is responsive to the transmit clock output 504. The processing circuitry 522 thereby samples a characteristic (phase) of the transmit clock output 504, and responsively determines phase corrections to the inphase clock output 508 and quadrature clock output 510. The phase control output 550 carries, e.g., digital control words from the processing circuitry 522 to the inphase phase interpolator 524 and to the quadrature phase interpolator 526. The inphase phase interpolator 524 and the quadrature phase interpolator 526 receive the digital control words on the phase correction inputs 528 and 530 respectively. The processing circuitry 522 may be a digital signal processor (DSP), general purpose central processing unit (CPU), application specific integrated circuit (ASIC), or other type of processing circuitry.

The processing circuitry 522 may be implemented with a timer and a first-order loop filter. The timer controls the duration of the phase interpolator phase adjustment process. The first-order loop filter applies gains and offsets to the phase detector output 514 to control the loop bandwidth. The loop filter generates a control output to advance or delay the inphase and quadrature clocks with the inphase phase interpolator 524 and the quadrature phase interpolator 526, depending on which phase interpolator clock is selected for phase adjustment.

The processing circuitry 522 may implement a closed-loop system. As such, the skew between the transmit clock output 504 and the inphase and quadrature clock outputs will diminish as time advances, with the proper alignment achieved after the timer expires. The processing circuitry 522 may, e.g., under software control, re-run the phase adjustment at any desired time or on any desired schedule, to regularly combat skew variation over process, voltage, and temperature (PVT). The processing circuitry 522 is shared between the inphase and quadrature clock phase adjustments, and this may reduce power and circuit space. That is, the processing circuitry 522 alternates between inphase and quadrature clock phase sampling, analysis and adjustment, and thereby is able, without duplicating circuitry, to control phase alignment for both the inphase and quadrature clock outputs. The inphase phase interpolator 524 thereby produces a phase adjusted inphase clock output 532, while the quadrature phase interpolator 526 produces a phase adjusted quadrature clock output 534.

In one implementation, when the rising edge of the inphase clock is earlier (later) than the rising edge of the transmit clock output 504, the processing circuitry 522 receives a logic 0 (logic 1) from the phase detector 512 and then encodes it to a numeric positive (negative) one. The processing circuitry 522 applies proper gain and offset to the encoded value to control the loop bandwidth and combat the false locking of the inphase clock phase to the wrong edge of the transmit clock output 504. Then, the processing circuitry 522 delays (advances) the inphase clock so that its rising edge will move closer to the rising edge of the transmit clock output 504. This process continues as the time rolls on. Once the rising edges of the inphase clock and the transmit clock output 504 are sufficiently close, the phase detector 512 will be operating in the metastable region and the processing circuitry 522 may dither (randomly delay or advance) the inphase clock. Since the phase detector 512 is designed to have an extremely small metastable region, the phase variation of the inphase clock phase is insignificant at this stage. When the timer expires, the rising edges of the inphase clock and the transmit clock output 504 will be closely aligned. The similar idea of the operation of the processing circuitry 522 also applies to the adjustment of the quadrature clock with respect to the transmit clock output 504.

FIG. 5 also illustrates transmit stream circuitry 536. The transmit stream circuitry 536 includes an inphase data selector 538 driven by the adjusted inphase clock output 532 and a quadrature data selector 540 driven by the adjusted quadrature clock output 534. A transmit data selector 542 combines the transmit data received from the inphase data selector 538 and the quadrature data selector 540 into a transmit stream output 544. The transmit data selector 542 is driven by the full speed transmit clock output 504.

Figure 6:
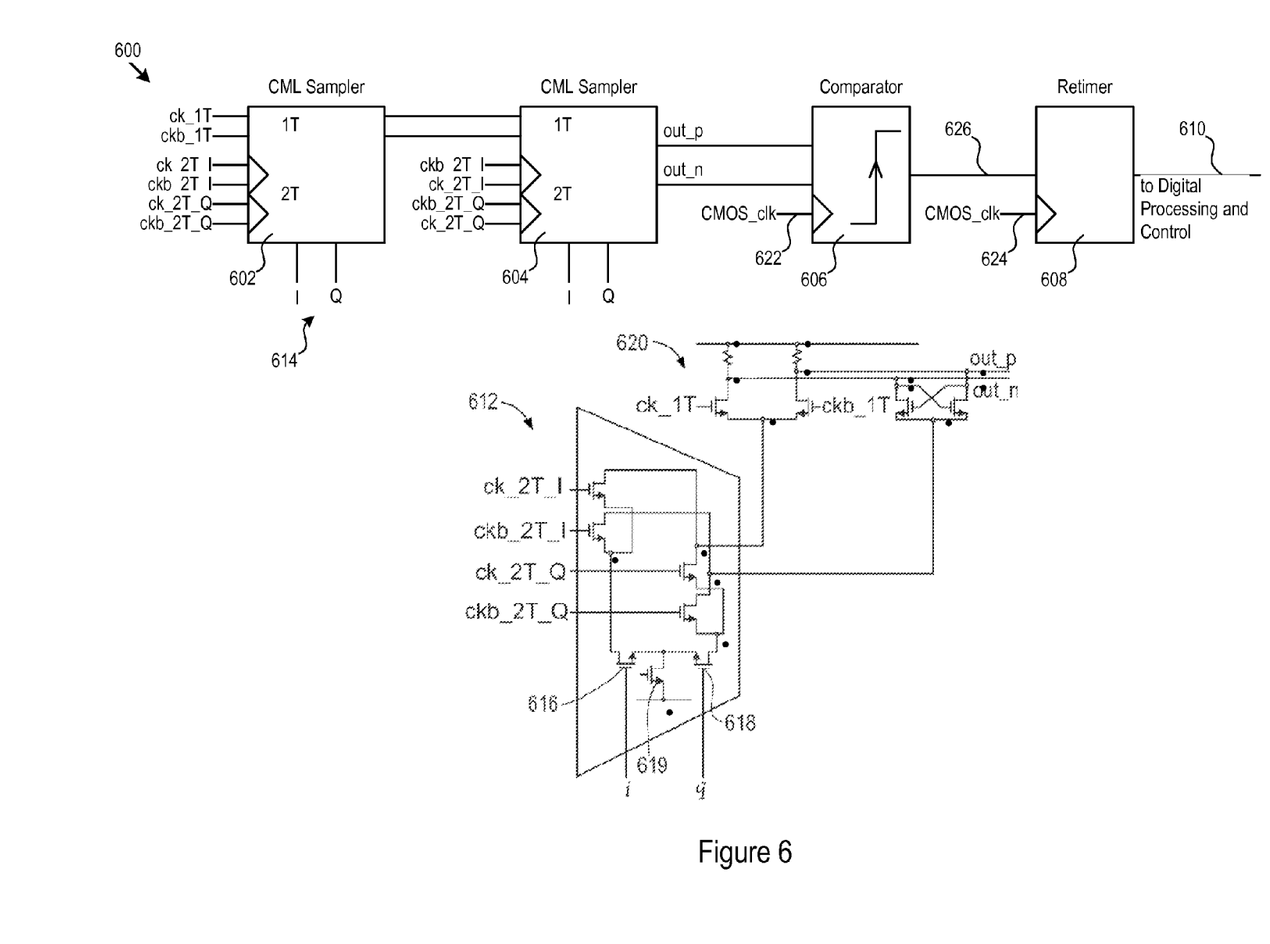
FIG. 6 shows a sampling system for obtaining clock samples which may be analyzed to determine phase adjustments to clock signals.

FIG. 6 shows a sampling circuitry 600 for obtaining clock samples which may be analyzed to determine phase adjustments to clock signals. The sampling circuitry 600 includes a first clock sampler 602 in series with a second clock sampler 604. A comparator circuit 606 follows the clock samplers 602 and 604, and a retimer circuit 608 follows the comparator circuit 606. The output of the retimer circuit 608 may be used as the phase detector output 514. In other implementations, the output of the comparator circuit 606 or the output of either sampler may be used, depending on the input compatibility of the processing circuitry 522.

The clock samplers in series implement a sample and hold circuit for obtaining clock samples, and the clock polarities are correspondingly reversed between the clock sampler 602 and the clock sampler 604. FIG. 6 also shows an example implementation 612 of each clock sampler. Note that the specifically labeled clock inputs in the example implementation 612 correspond to the clock sampler 602.

The clock samplers include sample selection inputs 614, which may correspond to the phase selection input 517. When the processing circuitry 522 asserts the I selection input, the transistor 616 conducts, which completes a current path through transistor 619 that allows the differential inphase clock signal ck_2T_i and ckb_2T_I to sample the differential baseline transmit clock, ck_1T and ckb_1T. The sample is held in the latch 620, with the output fed to the next circuit stage. Similarly, when the processing circuitry 522 asserts the Q selection input, the transistor 618 conducts, which completes a current path through transistor 619 that allows the differential quadrature clock signal ck_2T_Q and ckb_2T_Q to sample the differential baseline transmit clock, ck_1T and ckb_1T. The sample is again held in the latch 620, with the output fed to the next circuit stage.

The comparator circuit 606 may be implemented as a differential comparator. The comparator circuit 606 compares the outputs, out_p and out_n, of the clock sampler 604. On the comparator output 626, the comparator circuit outputs a '1' when out_p>out_n, and a '0' when out_p<out_n. As just one example, the output may be a CMOS level output compatible with the retimer circuit 608. The output of the comparator circuit 606 is a binary indicator of the relationship of out_p to out_n. The comparator circuit 606 may operate at a data rate set by the comparator clock 622, and the threshold is chosen so that the comparator output is compatible with the input voltage requirements of the processing circuitry 522. The comparator clock may be the same clock used for the processing circuitry 522, e.g., a 500 MHz clock.

The retimer circuit 608 helps provide a settled digital signal to the processing circuitry 522. In one implementation, the clock samplers 602 and 604, as well as the comparator circuit 606, are current mode logic (CML) circuits, while the retimer circuit 608 is a CMOS circuit. The retimer circuit 608 may implement a flip-flop, for instance, that holds the comparator output between clock pulses, level shifted for compatibility for the processing circuit 522.

Note that much of the sampling circuitry 600 is shared between the inphase and quadrature clock signals. The sharing helps to minimize mismatches caused by PVT variations. In FIG. 6, for instance, the sampling circuitry 600 shares the transistor 619 and the latch 620 between inphase and quadrature clock sampling, and therefore any PVT variations affect the inphase and quadrature sampling in the same direction. Further, the remaining transistors in the clock samplers may be fabricated very close together in the circuit layout, which helps make any PVT variations identical among these transistors.

Figure 7:
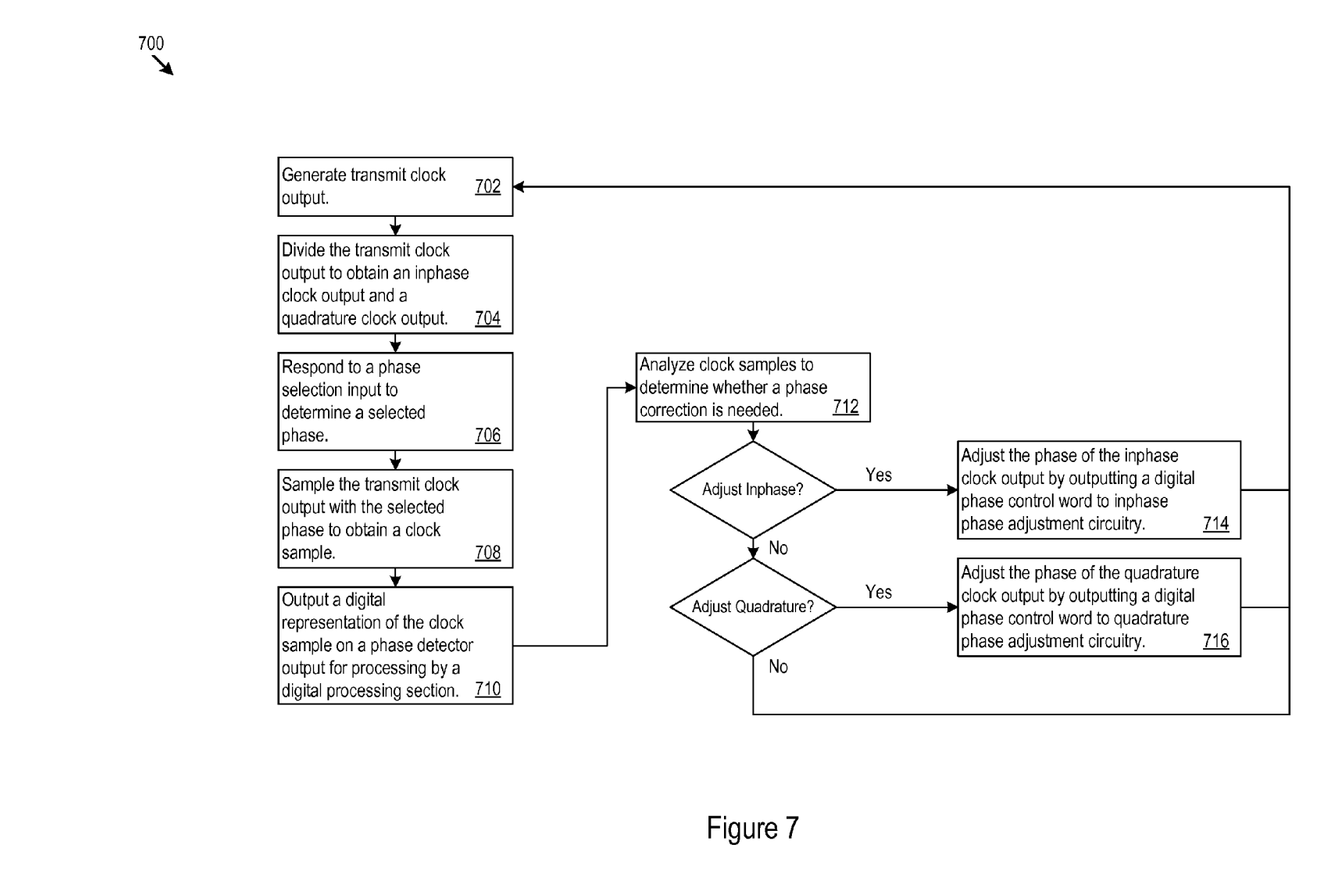
FIG. 7 shows a method for sampling clock signals, determining phase adjustments, and making phase adjustments to the clock signals.

FIG. 7 shows logic 700 for sampling clock signals, determining phase adjustments, and making phase adjustments to the clock signals. The logic 700 includes generating a transmit clock output (702) and dividing the transmit clock output to obtain an inphase clock output and a quadrature clock output (704). To sample, the logic 700 may implement sampling circuitry that responds to a phase selection input to determine a selected phase, which may be, for instance, the inphase clock output or the quadrature clock output (706). The logic 700 samples the transmit clock output with the selected phase to obtain a clock sample (708), and may output a digital representation of the clock sample on a phase detector output (710) for processing by a digital processing section.

The logic 700 also analyzes the clock samples to determine whether a phase correction is needed, responsive to the phase detector output (712). For instance, the processing circuitry 522 may determine a phase correction to the inphase clock output, the quadrature clock output, or both, with respect to the transmit clock output. Accordingly, the logic 700 may adjust the phase of the inphase clock output by outputting a digital phase control word to inphase phase adjustment circuitry (e.g., a phase interpolator) (714). In the same vein, the logic 700 may adjust the phase of the quadrature clock output by outputting a digital phase control word to quadrature phase adjustment circuitry (e.g., a phase interpolator) (716). The phase adjustment circuitry adjusts the clock phases responsive to receiving the phase corrections.

Note that sampling (708) may include multiple stage sampling, e.g., using a sample and hold series of clock samplers as described above. In addition, outputting the digital representation (710) may include adjusting the digital representation for input compatibility with processing circuitry that determines the phase correction.

In the architecture described above, a phase detector detects the phase difference between a reference full rate clock and either the inphase or quadrature clock generated by, e.g., a divide-by-2 block. Depending on the quadrature clock phase to be aligned, the processing circuitry sets the phase select input of the phase detector. The full rate clock (1T) is thus sampled by the half rate quadrature clock, and the samples indicate an 'early' or 'late' status that show the phase relation between full rate and quadrature clock. The samples are sent to the processing circuitry. Depending on the phase difference, the processing circuitry updates the control word of the phase interpolator between the clock divider and the phase detector, which determines the phase (or delay) of the quadrature clock. This update process continues till the phase is aligned.

Once the phase of the quadrature clock is aligned, the processing circuitry may set the phase select input to select the other quadrature clock. A similar alignment process follows. As temperature and supply voltage may deviate and affect the phase alignment, the processing circuitry may, according to any schedule, re-run the alignment process, continuing the switching between inphase and quadrature clock alignment.

The phase detector shares hardware for detecting the phase difference between 1T reference clock and quadrature clocks. One technical advantage of the phase detector is that, by avoiding separate hardware for phase detection for each quadrature clock, the phase detector minimizes any potential mismatch in the phase detection process. This helps to ensure that the phase difference between the quadrature clocks remains quadrature in nature. The architecture described above may be used to implement transmitter architectures for ultra high-speed transmitters, in which phase alignment is extremely important in terms of functionality and performance.

The architecture offers a compact mixed-mode solution to a very sophisticated problem, in the absence of which most of the powerful transmitter architectures become useless. In one performance measurement of a 64 GS/s DAC and a 2.7 GHz output at 64 GS/s, the architecture suppressed the inphase/quadrature mismatch component by 10 dB (approximately 2 bits).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
    a clock driver comprising a transmit clock output;
    a clock divider comprising:
        an inphase clock output; and
        a quadrature clock output;
    where the clock divider is configured to accept the transmit clock output and drive the inphase clock output and quadrature clock output according to the transmit clock output; and
    a phase detector comprising:
        a phase detector output;
        a phase selection circuit configured to determine a selected phase between the inphase clock output and the quadrature clock output;
        a sampling circuit configured to obtain a clock sample from the transmit clock output responsive to the selected phase; and
        a comparator configured to output a digital representation of the clock sample on the phase detector output.

2. The system of claim 1, further comprising:
    processing circuitry configured to accept the phase detector output and determine a phase correction.

3. The system of claim 2, where the phase correction comprises a phase correction to the inphase clock output, the quadrature clock output, or both, with respect to the transmit clock output.

4. The system of claim 2, further comprising:
    a phase interpolator in communication with the inphase clock output and the processing circuitry, the phase interpolator comprising a phase correction input responsive to the phase correction.

5. The system of claim 2, further comprising:
    a phase interpolator in communication with the quadrature clock output and the processing circuitry, the phase interpolator comprising a phase correction input responsive to the phase correction.

6. The system of claim 1, where the sampling circuit comprises:
    a first clock sampler in series with a second clock sampler.

7. The system of claim 2, where:
    the comparator is further configured to output a digital representation of the clock sample using a comparison threshold chosen for input compatibility with the processing circuitry.

8. The system of claim 2, where the processing circuitry comprises a phase selection output that specifies the selected phase for the phase selection circuit.

9. A method comprising:
    generating a transmit clock output;
    dividing the transmit clock output to obtain an inphase clock output and a quadrature clock output;
    responding to a phase selection input to determine a selected phase between the inphase clock output and the quadrature clock output;
    sampling the transmit clock output with the selected phase to obtain a clock sample; and
    outputting a digital representation of the clock sample on a phase detector output.

10. The method of claim 9, further comprising:
    determining a phase correction responsive to the phase detector output.

11. The method of claim 10, where determining comprises:
    determining a phase correction to the inphase clock output, the quadrature clock output, or both, with respect to the transmit clock output.

12. The method of claim 10, further comprising:
    adjusting phase of the inphase clock output responsive to receiving the phase correction.

13. The method of claim 10, further comprising:
    adjusting phase of the quadrature clock output responsive to receiving the phase correction.

14. The method of claim 9, where sampling comprises:
    two stage sampling comprising sampling with a first clock sampler in series with a second clock sampler.

15. The method of claim 10, further comprising:
    adjusting the digital representation for input compatibility with processing circuitry that determines the phase correction.

16. The method of claim 15, further comprising:
    receiving a phase selection output from the processing circuitry that specifies the selected phase.

17. A system comprising:
    a clock driver comprising a transmit clock output;
    a clock divider comprising:
        an inphase clock output; and
        a quadrature clock output;
    where the clock divider is configured to:
        accept the transmit clock output; and drive the inphase clock output and quadrature clock output responsive to the transmit clock output;

an inphase phase interpolator in communication with the inphase clock output, the inphase phase interpolator comprising a phase adjusted inphase clock output;

a quadrature phase interpolator in communication with the quadrature clock output, the quadrature phase interpolator comprising a phase adjusted quadrature clock output; and transmit stream circuitry comprising:
- an inphase data selector driven by the adjusted inphase clock output;
- a quadrature data selector driven by the adjusted quadrature clock output; and
- a transmit data selector configured to combine transmit data received from the inphase data selector and the quadrature data selector into a transmit stream according to the transmit clock output.

18. The system of claim 17, further comprising:
a phase detector comprising:
- a phase detector output;
- a phase selection circuit configured to determine a selected phase between the inphase clock output and the quadrature clock output; and
- a sampling circuit configured to obtain timing samples from the transmit clock output responsive to the selected phase.

19. The system of claim 18, further comprising:
processing circuitry configured to:
accept the timing samples;
determine an inphase clock phase correction over time responsive to the timing samples; and
determine a quadrature clock phase correction over time responsive to the timing samples.

20. The system of claim 19, where:
the inphase phase interpolator is in communication with the processing circuitry and configured to:
- receive the inphase clock phase correction; and
- responsively generate the phase adjusted inphase clock output; and the quadrature phase interpolator is in communication with the processing circuitry and configured to:
- receive the quadrature clock phase correction; and
- responsively generate the phase adjusted quadrature clock output.

* * * * *